(12) United States Patent
Reimer

(10) Patent No.: US 11,358,529 B2
(45) Date of Patent: Jun. 14, 2022

(54) APPARATUSES AND METHODS FOR AN AUTOMATIC STEPGATE

(71) Applicant: Paul Reimer, Seattle, WA (US)

(72) Inventor: Paul Reimer, Seattle, WA (US)

( * ) Notice: Subject to any disclaimer, the term of this patent is extended or adjusted under 35 U.S.C. 154(b) by 376 days.

(21) Appl. No.: 16/704,786

(22) Filed: Dec. 5, 2019

(65) Prior Publication Data

US 2021/0170950 A1   Jun. 10, 2021

(51) Int. Cl.
  *B60R 3/02*   (2006.01)
  *B62D 33/03*   (2006.01)

(52) U.S. Cl.
  CPC ............... *B60R 3/02* (2013.01); *B62D 33/03* (2013.01)

(58) Field of Classification Search
  CPC .................................. B60R 3/02; B62D 33/03
  See application file for complete search history.

(56) References Cited

U.S. PATENT DOCUMENTS

| | | | | |
|---|---|---|---|---|
| 3,507,515 A * | 4/1970 | Brammer | ................... | B60R 3/02 280/166 |
| 4,161,997 A * | 7/1979 | Norman | ...................... | E06C 5/00 182/127 |
| 4,191,388 A * | 3/1980 | Barksdale | ................. | B60R 3/02 280/166 |
| 4,571,144 A * | 2/1986 | Guidry | .................... | B60P 1/435 182/48 |
| 4,639,032 A * | 1/1987 | Barbour | ..................... | B60R 3/02 296/62 |
| 5,205,603 A * | 4/1993 | Burdette, Jr. | ............. | B60R 3/02 182/195 |
| 5,312,150 A * | 5/1994 | Quam | ................ | B62D 33/0273 296/57.1 |
| 5,549,312 A * | 8/1996 | Garvert | ..................... | B60R 3/02 280/166 |
| 5,732,996 A * | 3/1998 | Graffy | ....................... | B60R 3/02 280/166 |
| 5,791,717 A * | 8/1998 | Reich | ..................... | B60P 1/435 296/61 |
| 6,116,378 A * | 9/2000 | Barrow | ..................... | B60R 3/02 182/95 |
| 6,270,139 B1 * | 8/2001 | Simpson | ................. | B60P 1/435 296/62 |
| 6,364,392 B1 * | 4/2002 | Meinke | ..................... | B60P 3/40 296/57.1 |
| 6,422,342 B1 * | 7/2002 | Armstrong | ................ | E06C 5/02 182/127 |
| 6,631,938 B1 * | 10/2003 | Burns | ...................... | B60P 3/36 297/14 |
| 6,918,624 B2 * | 7/2005 | Miller | .................. | B62D 33/037 182/127 |

(Continued)

*Primary Examiner* — Jacob B Meyer

(57) ABSTRACT

Apparatuses and methods for providing an automatic tailgate step are provided. The apparatuses may comprise a tailgate comprising a tailgate latch; a bumper; a trailer hitch; and at least two tailgate steps each comprising a foot step. As such, the tailgate latch may be affixed to the tailgate, such that when a user engages the tailgate latch when the tailgate is in a closed position the at least two tailgate steps are released, and wherein the at least two tailgate steps when released may freely swing clear of the bumper and the trailer hitch as the user pulls the tailgate down such that when the tailgate is in a fully open position the user may utilize the foot step of each tailgate step.

20 Claims, 4 Drawing Sheets

(56) References Cited

U.S. PATENT DOCUMENTS

| | | | |
|---|---|---|---|
| 6,942,271 B1* | 9/2005 | Jamison | B60R 3/007 296/61 |
| 6,942,272 B2* | 9/2005 | Livingston | B62D 33/027 296/57.1 |
| 7,080,713 B1* | 7/2006 | Riggs | B60R 3/02 182/127 |
| 7,168,722 B1* | 1/2007 | Piotrowski | B60R 3/02 280/166 |
| 7,234,750 B1* | 6/2007 | Doolittle | B60R 3/02 296/57.1 |
| 7,261,357 B1* | 8/2007 | Bechen | B60R 3/02 296/57.1 |
| 7,401,833 B2* | 7/2008 | Dryja | B60R 3/02 296/61 |
| 7,909,381 B2* | 3/2011 | King | B62D 33/0273 296/62 |
| 8,091,943 B1* | 1/2012 | Weber | B60R 3/02 280/166 |
| 8,182,013 B1* | 5/2012 | Alvarado | B60R 3/007 182/127 |
| 8,201,869 B1* | 6/2012 | Butlin, Jr. | B60R 3/02 296/57.1 |
| 8,246,063 B1* | 8/2012 | Rowland | B60R 3/02 280/166 |
| 8,348,325 B2* | 1/2013 | Hausler | B62D 33/0273 296/62 |
| 8,360,455 B2* | 1/2013 | Leitner | B60R 3/02 280/166 |
| 8,985,606 B2* | 3/2015 | Fichter | B60R 3/02 280/166 |
| 9,487,147 B1* | 11/2016 | Morrill | B60R 3/02 |
| 9,902,328 B1* | 2/2018 | Mazur | B60R 3/02 |
| 9,994,263 B1* | 6/2018 | Richter | B60P 1/435 |
| 2004/0160079 A1* | 8/2004 | Harper | B62D 33/03 296/61 |
| 2005/0046219 A1* | 3/2005 | Livingston | B62D 33/027 296/62 |
| 2008/0106111 A1* | 5/2008 | Pritchard | B60R 3/02 296/62 |
| 2010/0089698 A1* | 4/2010 | Brodsack | E06C 5/04 182/127 |
| 2010/0181741 A1* | 7/2010 | Webb | B60R 3/02 280/166 |
| 2011/0233954 A1* | 9/2011 | Micheli | B62D 33/03 296/62 |
| 2016/0264191 A1* | 9/2016 | Wassell | B60P 1/02 |
| 2017/0291551 A1* | 10/2017 | Krajenke | B62D 33/0273 |
| 2017/0297468 A1* | 10/2017 | Wereski | B62D 33/0273 |
| 2018/0201329 A1* | 7/2018 | Barrios Albert | B62D 33/0273 |
| 2019/0389388 A1* | 12/2019 | Ngo | B60R 3/02 |
| 2021/0039722 A1* | 2/2021 | Williamson | B60R 9/065 |
| 2021/0170950 A1* | 6/2021 | Reimer | B60R 3/02 |

* cited by examiner

APPARATUSES AND METHODS FOR AN AUTOMATIC STEPGATE

FIELD OF DISCLOSURE

The present disclosure relates to apparatuses, and methods for providing an automatic stepgate, or tailgate step, for vehicles.

BACKGROUND

Trucks, and other types of vehicles often have tailgates that are on the rear side of the vehicle. These tailgates open up and allow individuals to access the bed of the vehicle where they are able to store things for transport. Often an individual would like to access the bed for organizing items they are storing, or other reasons. In order to access the bed of the vehicle an individual may use a stepgate, or tailgate step, that allows them to step up into the bed of the vehicle.

Often time's trucks, or other vehicles, may be used for towing trailers, boats, and other items. The items are towed via a trail hitch that sits below the bumper under the tailgate. When the trailer hitch is being used to tow something an individual may be unable to access the bed of a truck.

SUMMARY

One aspect of the present disclosure relates to an apparatus for providing an automatic tailgate step, comprising: a tailgate comprising a tailgate latch; a bumper; and at least two tailgate steps each comprising a foot step; wherein, the tailgate latch is affixed to the tailgate, such that when a user engages the tailgate latch when the tailgate is in a closed position the at least two tailgate steps are released, and wherein the at least two tailgate steps when released may freely swing clear of the bumper and the trailer hitch as the user pulls the tailgate down such that when the tailgate is in a fully open position the user may utilize the foot step of each tailgate step. In some embodiments the present aspect may contain additional, or fewer, components, or perform additional, or fewer, steps.

Another aspect of the present disclosure relates to an apparatus for providing an automatic tailgate step, comprising: a tailgate comprising a tailgate latch; a bumper; at least two tailgate steps each comprising a foot step; and at least two tailgate channels; wherein, the tailgate latch is incorporated into the tailgate, such that when a user engages the tailgate latch when the tailgate is in a closed position the at least two tailgate steps are released from the at least two tailgate channels, and wherein the at least two tailgate steps when released may freely swing clear of the bumper and the trailer hitch as the user pulls the tailgate down such that when the tailgate is in a fully open position the user may utilize the foot step of each tailgate step. In some embodiments the present aspect may contain additional, or fewer, components, or perform additional, or fewer, steps.

Advantages will become more apparent to those of ordinary skill in the art from the following description of the preferred aspects, which have been shown and described by way of illustration. As will be realized, the present embodiments may be capable of other and different aspects, and their details are capable of modification in various respects. Accordingly, the drawings and description are to be regarded as illustrative in nature and not as restrictive.

Figure 1:
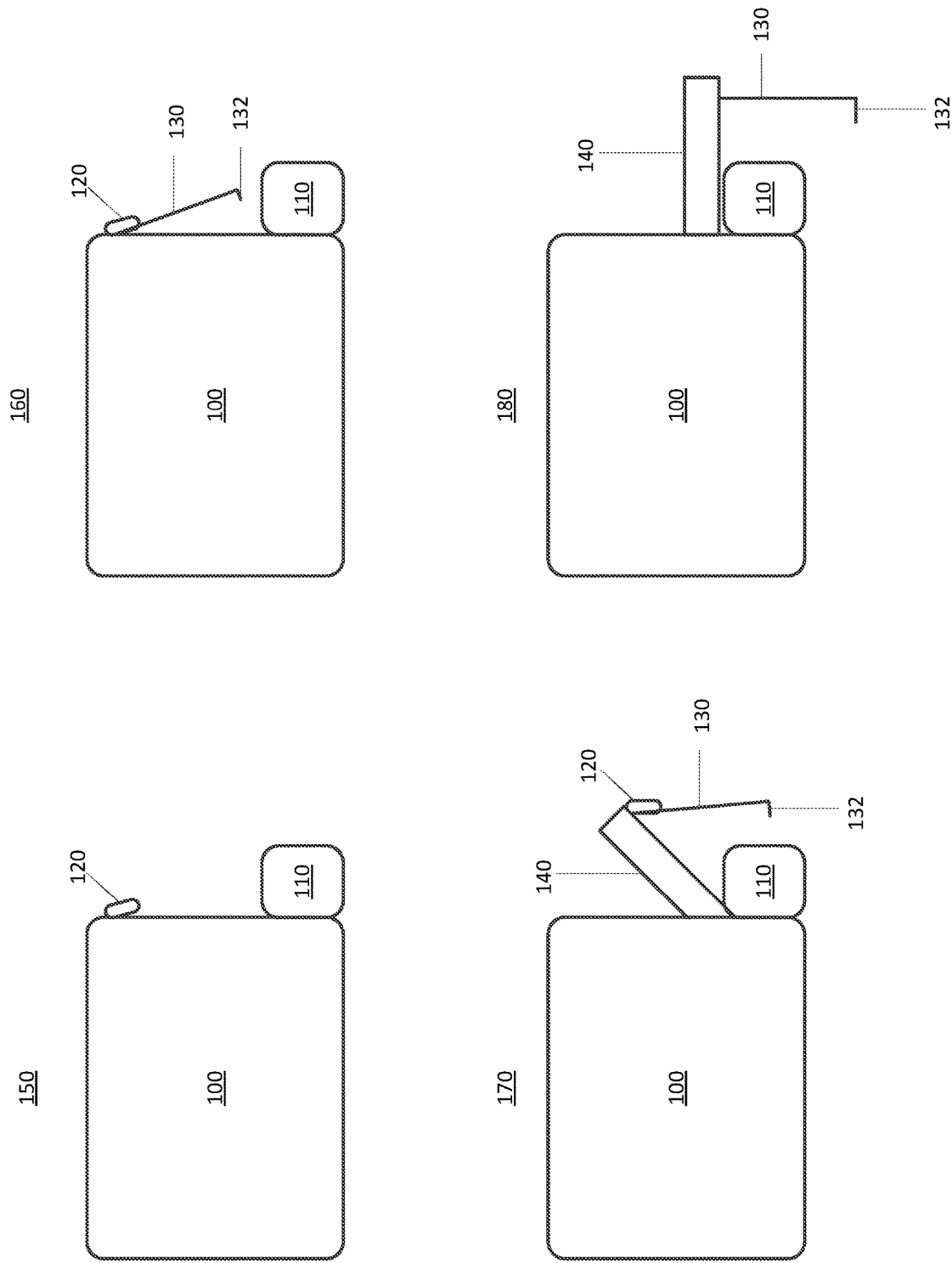
FIG. 1 is a side view of an example embodiment of an apparatus in various stages of deployment.

The figures depict aspects of the present embodiments for purposes of illustration only. One skilled in the art will readily recognize from the following discussion that alternate aspects of the structures and methods illustrated herein may be employed without departing from the principles of the invention described herein.

DETAILED DESCRIPTION

Apparatuses and methods for providing an automatic tailgate step are provided. The apparatuses may comprise a tailgate comprising a tailgate latch; a bumper; a trailer hitch; and at least two tailgate steps each comprising a foot step. As such, the tailgate latch may be affixed to the tailgate, such that when a user engages the tailgate latch when the tailgate is in a closed position the at least two tailgate steps are released, and wherein the at least two tailgate steps when released may freely swing clear of the bumper and the trailer hitch as the user pulls the tailgate down such that when the tailgate is in a fully open position the user may utilize the foot step of each tailgate step.

As used herein, stepgate and, or, tailgate step may refer to the same component, or apparatus. In some cases, the stepgate, or tailgate step, is a stand-alone device sold to users as an after-market add on for a vehicle they have purchased, and in other cases the stepgate, and, or, tailgate step is built as part of the vehicle during initial construction of the vehicle. In all cases the stepgate, or tailgate step, provides a technical solution to allowing a user to access the bed of a vehicle, a truck for example, when that vehicle is towing an item, such as a boat, for example.

FIGS. 1-4 showcase various configurations of the apparatuses described herein. FIGS. 1-4 are not meant to be exhaustive, and in some cases the apparatuses depicted may have fewer or more components than shown in the drawings. Similarly, the drawings shown at least one, but not all, methods of operating the apparatuses described herein.

FIG. 1 is a side view of an example embodiment of the apparatus in various stages of deployment. The figure shows one example process by which the stepgate, or tailgate step, may be deployed. In other embodiments, there may be alternative processes by which the stepgate, or tailgate step, may deploy as detailed in this description.

FIG. 1 shows a vehicle 100, a bumper 110 and trailer hitch 112, a tailgate latch 120, a stepgate 130 and stepgate steps 132, and a tailgate 140. There are four different example stages (150, 160, 170, and 180) of the stepgate deploying. At stage 150, the tailgate 140 is closed, and the tailgate latch 120 has not been actuated yet for the stepgate 130 to deploy. At stage 160, the tailgate latch 120 has been pulled and the stepgate 130 pops out from the tailgate 140. At stage 170, the tailgate 140 is being pulled down and the stepgate 130 has cleared the bumper 110. At the final stage, stage 180, the tailgate 140 is fully open and the stepgate 130 is now perpendicular with the tailgate 140. At stage 180, an individual may use the stepgate steps 132 to step up into the bed (not shown) of the vehicle 100. Additionally, given the separation between the tailgate steps 132, if an individual had something affixed to the trailer hitch 112, such as a boat, or other item being towed, the individual would be able to still step up into the tailgate 150 and bed (not shown) of the vehicle 100.

Figure 2:
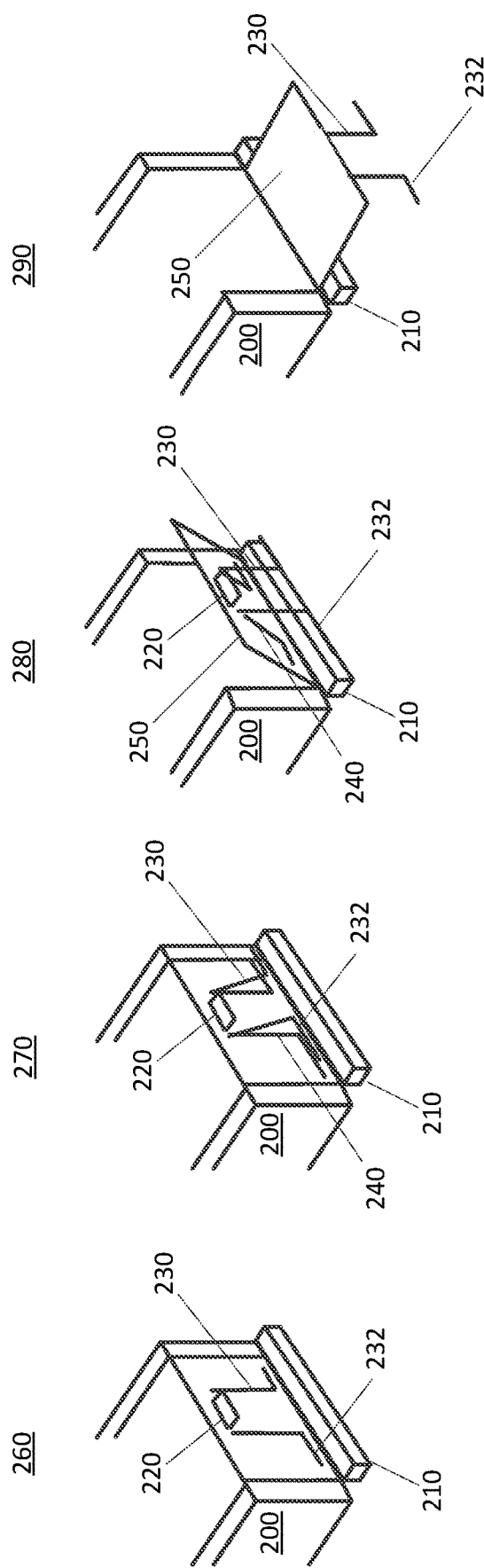
FIG. 2 is a side view of an example embodiment of an apparatus in various stages of deployment.

FIG. 2 is a side view of an example embodiment of the apparatus in various stages of deployment. The figure shows one example process by which the tailgate step may be deployed. In other embodiments, there may be alternative processes by which the tailgate step may deploy as detailed in this description.

FIG. 2 shows a vehicle 200, a bumper 210, a tailgate latch 220, a stepgate 230 and stepgate steps 232, channels 240, and a tailgate 250. In this example, the stepgate 230 comprises two components that each have a stepgate step 232 at the end. In other embodiments, the stepgate 230 may be one single component with at least two stepgate steps 232 at the ends similar to the configuration shown in FIG. 2. Additionally, in some embodiments the channels 240 are not necessary. In those embodiments, the stepgate 230 may be affixed on top of the tailgate 250, and deployed via a system affixed to the tailgate latch 220.

There are four different example stages (260, 270, 280, and 290) of the stepgate 230 deploying. At stage 260, the tailgate 250 is closed, and the tailgate latch 220 has not been actuated yet for the stepgate 230 to deploy. At stage 270, the tailgate latch 220 has been pulled and the stepgate 230 pops out from the tailgate 250. At stage 270, the tailgate 250 is being pulled down and the stepgate 230 has cleared the bumper 210. At the final stage, stage 280, the tailgate 240 is fully open and the stepgate 230 is now perpendicular with the tailgate 240. At stage 280, an individual may use the stepgate steps 232 to step up into the bed (not shown) of the vehicle 200. Additionally, given the separation between the tailgate steps 232, if an individual had something affixed to the trailer hitch 212, such as a boat, or other item being towed, the individual would be able to still step up into the tailgate 250 and bed 202 of the vehicle 200.

Figure 3:
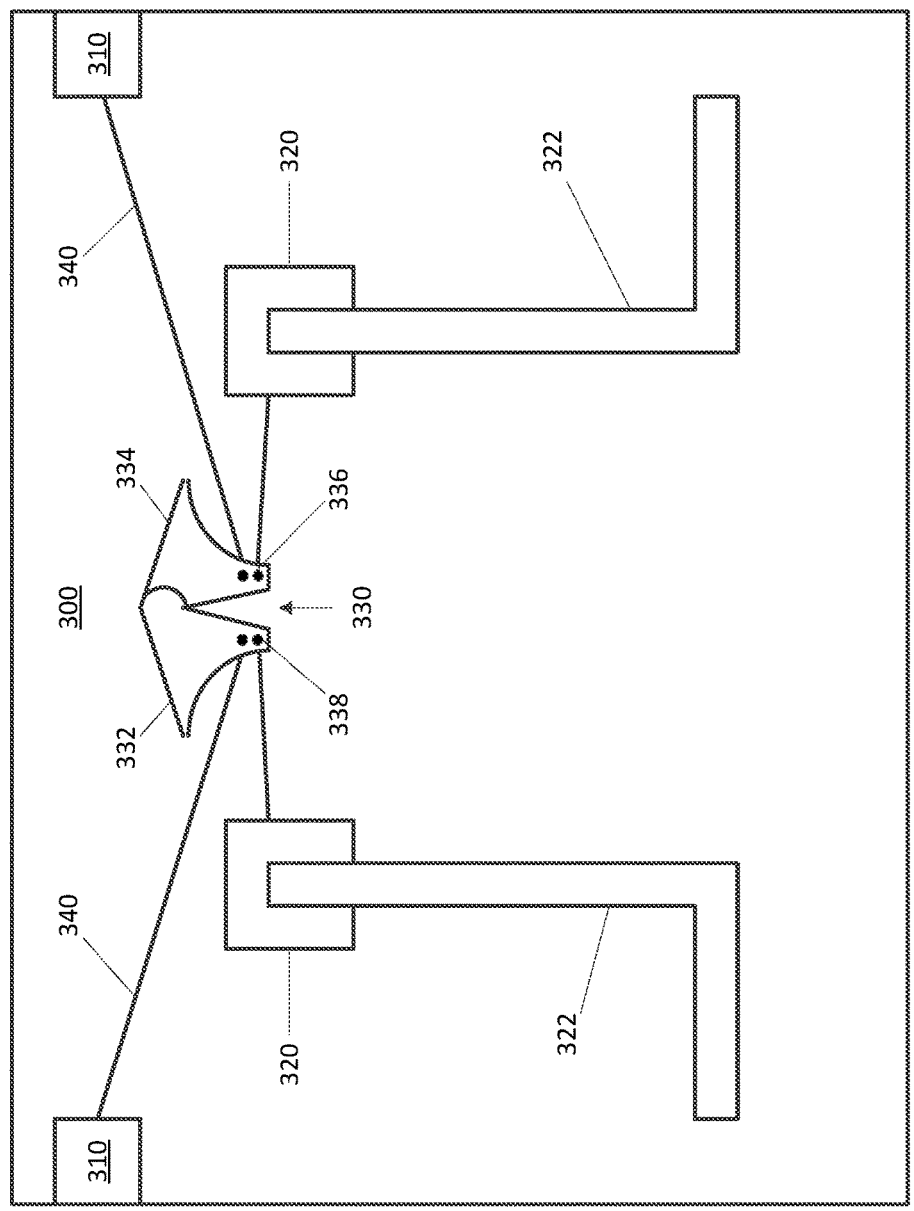
FIG. 3 is an example embodiment of a tailgate as it may be arranged on a tailgate.

FIG. 3 is an example implementation of the apparatus as it may be arranged on a tailgate. In this example implementation, the apparatus may include a tailgate 300, hinges 310, stepgate 320 and stepgate steps 322, and a control rod system 330 comprising a left hemisphere 332, a right hemisphere 334, a right keyhole set 336, a left keyhole set 338, and a set of control rods 340. Here the stepgate 320 is arranged it lays at a forty-five degree angle with the ground on the tailgate 300, and as such when the stepgate is deployed via the control rod system 330 the stepgate steps 322 are able to clear a trail hitch and come to rest at, or around, a ninety degree angle with the ground. As the tailgate 300 is lowered the stepgate 322 may swing down via the force of gravity to reach its angle with the ground. Given the separation in the stepgate 322 with steps on both the left and right side of the tailgate 300 a user of the apparatus is able to enter the bed of the vehicle (not shown) via the stepgate 322 even when something such as, for example, a boat is attached to a trailer hitch (not shown) of the vehicle.

In some embodiments the control rod assembly 330, and the stepgate housing 332, and stepgate 322 may be enclosed inside of the tailgate 400 itself. In other embodiments, the control rod assembly 330, and the stepgate housing 332, and stepgate 322 may be affixed to the tailgate 300 exterior. Similarly, the control rod assembly 330 may be actuated by a trailer latch, such as the trailer latch disclosed later in this description.

Figure 4:
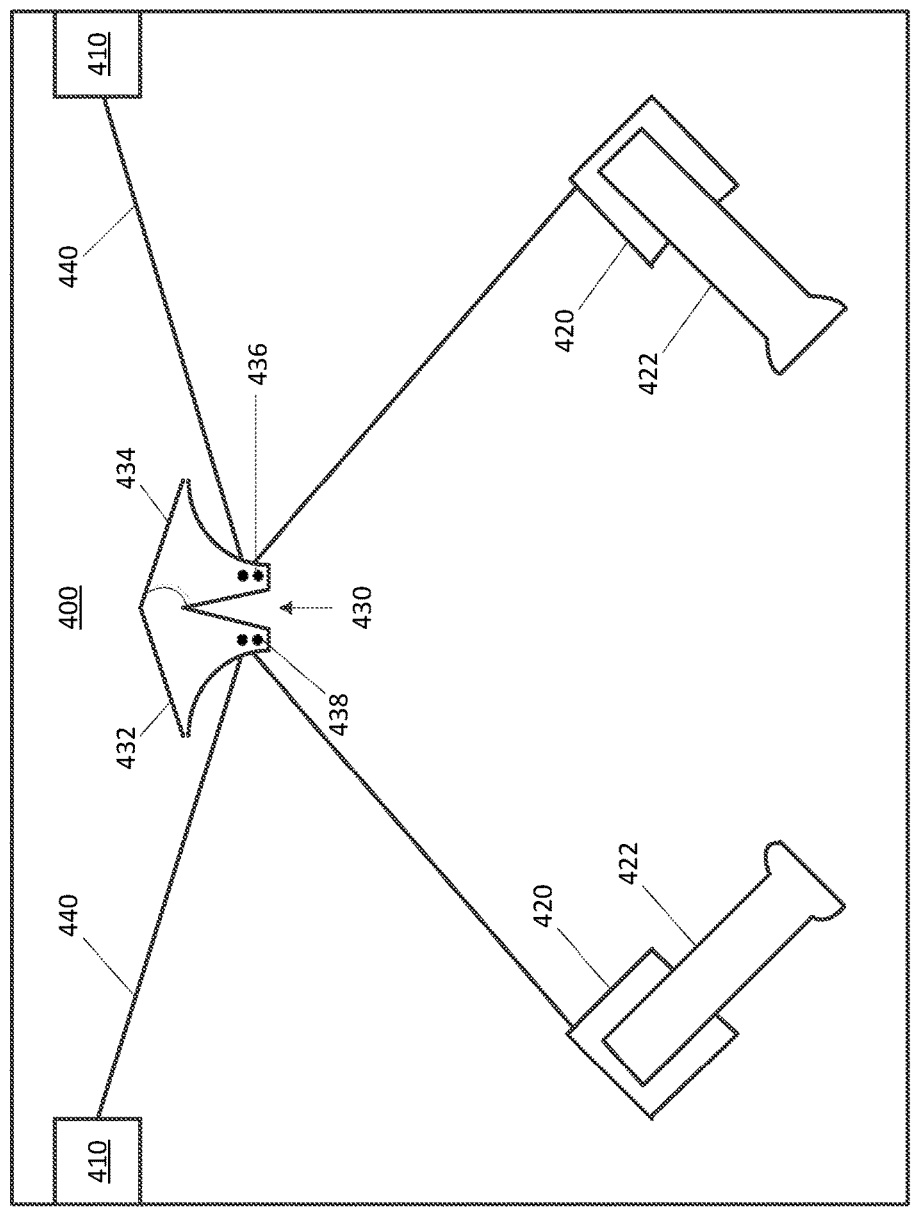
FIG. 4 is an example embodiment of a tailgate as it may be arranged on a tailgate.

FIG. 4 is an example implementation of the apparatus as it may be arranged on a tailgate. In this example implementation, the apparatus may include a tailgate 400, hinges 410, stepgate housing 420 and stepgate 422, and a control rod system 430 comprising a left hemisphere 432, a right hemisphere 434, a right keyhole set 436, a left keyhole set 438, and a set of control rods 440. Here the stepgate 420 is arranged such that it lays at a forty-five degree angle with the ground on the tailgate 400, and as such when the stepgate is deployed via the control rod system 430 the stepgate 422 is able to clear a trail hitch and come to rest at, or around, a ninety degree angle with the ground. As the tailgate 400 is lowered the stepgate 422 may swing down via the force of gravity to reach its angle with the ground. Given the separation in the stepgate 422 with steps on both the left and right side of the tailgate 400 a user of the apparatus is able to enter the bed of the vehicle (not shown) via the stepgate 422 even when something such as, for example, a boat is attached to a trailer hitch (not shown) of the vehicle.

In some embodiments the control rod assembly 430, and the stepgate housing 432, and stepgate 422 may be enclosed inside of the tailgate 400 itself. In other embodiments, the control rod assembly 430, and the stepgate housing 432, and stepgate 422 may be affixed to the tailgate 400 exterior. Similarly, the control rod assembly 430 may be actuated by a trailer latch, such as the trailer latch disclosed later in this description.

The subsequent description details particular embodiments of various approaches to apparatuses that provide an automatic stepgate, or tailgate step. Unless otherwise noted, or prevented by the composition of a particular apparatus, the embodiments detailed below are shown in FIGS. 1-4.

An exemplary embodiment of the ideas disclosed herein may comprise an apparatus for providing an automatic tailgate step. The apparatus may function and be implemented according to what is shown in FIGS. 1-4. In some embodiments the apparatus may include less or more components than are shown in FIGS. 1-4.

The apparatus may comprise a plurality of components, such as, for example, a tailgate comprising a tailgate latch; a bumper, and a tailgate step that in one embodiment may comprise at least two tailgate steps each comprising a foot step. In other embodiments, the apparatus may further comprise a trailer hitch.

In one embodiment of the apparatus, the tailgate step may be one continuous physically connected piece with two protrusions creating steps each with their own foot step. In some embodiments of the apparatus, the tailgate latch may be affixed to the tailgate, such that when a user engages the tailgate latch when the tailgate is in a closed position the at least two tailgate steps are released. Upon release the at least two tailgate steps may freely swing clear of the bumper as the user pulls the tailgate down such that when the tailgate is in a fully open position the user may utilize the foot step of each tailgate step. In other embodiments where the apparatus further comprises a trailer hitch the apparatus may be configured such that when the tailgate steps are deployed they clear both the bumper and the trailer hitch. Regardless of the configuration, the tailgate step may be automatically lowered as the user opens the tailgate making it easy for the user to step up onto the tailgate and into a bed of the vehicle.

In some embodiments of the apparatus when the user engages the tailgate latch the tailgate steps may be released an initial amount of at least fifteen degrees from the tailgate. In other embodiments, when the user engages the tailgate latch the tailgate steps may be released at least thirty degrees from the tailgate.

In some embodiments, the apparatus as described in the previous paragraphs may include a tailgate that further comprises a spring system configured to push away the tailgate steps when the user engages the tailgate latch.

In some embodiments, the tailgate steps may be configured such that when the tailgate steps are released the tailgate steps swing freely away from the tailgate and bumper due to the pull of gravity on the tailgate step. Alternatively, the user may pull the tailgate steps out as the tailgate is lowered by the user. Regardless of how the tailgate steps are deployed, when the tailgate is in the fully open position the tailgate steps may be approximately ninety degrees from the tailgate and approximately perpendicular to the ground.

In some embodiments, the at least two tailgate steps may be configured such that one tailgate step is affixed to the left side of the tailgate, and the second tailgate step is affixed to the right side of the tailgate. As such, in some embodiments of the apparatus the tailgate step affixed to the left side of the tailgate comprises a foot step that points left away from the center of the tailgate, and the tailgate step affixed to right side of the tailgate that points right away from the center of the tailgate.

In some embodiments, the tailgate steps may lay on top of the tailgate itself. As such, the tailgate steps may be an "after-market" add on for the vehicle, that is purchased after the vehicle itself was purchased. In other embodiments, the tailgate may physically include at least two channels to house the tailgate steps. Accordingly, when the channels are physically incorporated into the tailgate they are included at the time of manufacture of the vehicle prior to a user purchasing the vehicle.

In some embodiments of the apparatus when the tailgate is lifted and put back into a closed position the at least two tailgate steps are locked into position in relation to the tailgate. Alternatively, in embodiments where the tailgate has channels for the tailgate steps when the tailgate is lifted and put back into a closed position the at least two tailgate steps are locked into their respective channels.

In some embodiments of the apparatus the at least two tailgate steps may be configured to lay on the tailgate perpendicular to the ground, or the at least two tailgate steps may be configured to lay on the tailgate at a forty-five degree angle in relation to the ground. How the tailgate steps are arranged on the tailgate my impact how the tailgate steps deploy. For example, when lay perpendicular to the ground the tailgate steps may swing toward the user until they come to rest once the tailgate is fully open. Similarly, when the tailgate steps are aligned forty-five degrees to the ground the tailgate steps may swing seemingly away from the user while tailgate is being opened.

In some embodiments of the apparatus, the tailgate latch further comprises: a pulley system comprising at least two hemispheres that rotate in relation to each other; at least two keyholes incorporated into the two hemispheres; and at least two lengths of cable affixed to the at least two hemispheres via the at least two keyholes. In such an embodiment, the tailgate latch may be configured to actuate the at least two hemispheres when the user engages the tailgate latch thereby causing the two lengths of cable to release the at least two tailgate steps.

In other embodiments of the apparatus, the tailgate latch further comprises: a control rod system comprising at least two control arms that rotate in relation to each other; at least two keyholes incorporated into the two control arms; and at least two control rods affixed to the at least two control arms via the at least two keyholes. In such an embodiment, the tailgate latch may be configured to actuate the at least two control arms when the user engages the tailgate latch thereby causing the two control rods to release the at least two tailgate steps.

In yet other embodiments, the apparatus may comprise a tailgate step with at least two footsteps and a rod assembly that allows the tailgate step to be fully integrated into the operation of a tailgate. The assembly may be affixed to a tailgate latch that is part of the tailgate such that the tailgate steps freely swing open and deploy downward via the force of gravity as the tailgate is opened. In such an arrangement when the tailgate is opened the tailgate step may clear both the bumper and a trailer hitch allowing a user to access the bed of the vehicle even when something is affixed to the trailer hitch. In this embodiment, the tailgate step may lay on the tailgate perpendicularly, or it may lay on the tailgate at a forty-five degree angle.

In one embodiment, a method for operating the apparatus is disclosed. The method may comprise a user actuating a trailer latch affixed to a tailgate and to a system for deploying a set of tailgate steps, wherein the tailgate steps may freely swing from a tailgate and as the tailgate is lowered the tailgate steps clear a bumper, and in some cases also a trailer hitch with something affixed to it, and the tailgate steps ultimately come to rest approximately perpendicular to the ground. After a user has effectively executed the method of opening the tailgate the user may utilize the tailgate steps to step up into the bed of a vehicle, or onto the tailgate itself, regardless of if the vehicle has, for example, a boat affixed to the trailer hitch.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and may improve the functioning of conventional computers.

This detailed description is to be construed as examples and does not describe every possible embodiment, as describing every possible embodiment would be impractical, if not impossible. One could implement numerous alternate embodiments, using either current technology or technology developed after the filing date of this application.

I claim:

1. An apparatus for providing an automatic tailgate step, comprising:
   a tailgate comprising a tailgate latch;
   a bumper;
   a trailer hitch; and
   at least two tailgate steps each comprising a foot step;
   wherein, the tailgate latch is affixed to the tailgate, such that when a user engages the tailgate latch when the tailgate is in a closed position the at least two tailgate steps are released,
   and wherein the at least two tailgate steps when released may freely swing clear of the bumper and the trailer hitch as the user pulls the tailgate down such that when the tailgate is in a fully open position the user may utilize the foot step of each tailgate step.

2. The apparatus of claim 1, wherein when the user engages the tailgate latch the tailgate steps are released an initial amount of at least fifteen degrees from the tailgate.

3. The apparatus of claim 2, wherein the tailgate further comprises a spring system configured to push away the tailgate steps when the user engages the tailgate latch.

4. The apparatus of claim 1, wherein the tailgate steps are configured such that when the tailgate steps are released the tailgate steps swing freely away from the tailgate, bumper, and trailer hitch due to the pull of gravity on the tailgate step.

5. The apparatus of claim 1, wherein when the tailgate is in the fully open position the tailgate steps are ninety degrees from the tailgate and perpendicular to the ground.

6. The apparatus of claim 1, wherein the two tailgate steps are configured such that one tailgate step is affixed to the left side of the tailgate, and the second tailgate step is affixed to the right side of the tailgate.

7. The apparatus of claim 6, wherein the tailgate step affixed to the left side of the tailgate comprises a foot step that points left away from the center of the tailgate, and wherein the tailgate step affixed to the right side of the tailgate points right away from the center of the tailgate.

8. The apparatus of claim 1, wherein the tailgate further comprises at least two channels to house the tailgate steps.

9. The apparatus of claim 1, wherein when the tailgate is lifted and put back into a closed position the at least two tailgate steps are locked into position in relation to the tailgate.

10. The apparatus of claim 8, wherein when the tailgate is lifted and put back into a closed position the at least two tailgate steps are locked into their respective channels.

11. The apparatus of claim 1, wherein the at least two tailgate steps may be configured to lay on the tailgate perpendicular to the ground, or the at least two tailgate steps may be configured to lay on the tailgate at a forty-five degree angle in relation to the ground.

12. The apparatus of claim 1, wherein the tailgate latch further comprises:
   a control rod system comprising at least two control arms that rotate in relation to each other;
   at least two keyholes incorporated into the two control arms; and
   at least two control rods affixed to the at least two control arms via the at least two keyholes;
   wherein the tailgate latch is configured to actuate the at least two control arms when the user engages the tailgate latch thereby causing the two control rods to release the at least two tailgate steps.

13. An apparatus for providing an automatic tailgate step, comprising:
   a tailgate comprising a tailgate latch;
   a bumper;
   a trailer hitch;
   at least two tailgate steps each comprising a foot step; and
   at least two tailgate channels;
   wherein, the tailgate latch is incorporated into the tailgate, such that when a user engages the tailgate latch when the tailgate is in a closed position the at least two tailgate steps are released from the at least two tailgate channels,
   and wherein the at least two tailgate steps when released may freely swing clear of the bumper and the trailer hitch as the user pulls the tailgate down such that when the tailgate is in a fully open position the user may utilize the foot step of each tailgate step.

14. The apparatus of claim 13, wherein the tailgate latch further comprises:
   a control rod system comprising at least two control arms that rotate in relation to each other;
   at least two keyholes incorporated into the two control arms; and
   at least two control rods affixed to the at least two control arms via the at least two keyholes;
   wherein the tailgate latch is configured to actuate the at least two control arms when the user engages the tailgate latch thereby causing the two control arms to release the at least two tailgate steps.

15. The apparatus of claim 13, wherein when the user engages the tailgate latch the tailgate steps are released an initial amount of at least fifteen degrees from the tailgate.

16. The apparatus of claim 13, wherein the tailgate further comprises a spring system configured to push away the tailgate steps when the user engages the tailgate latch.

17. The apparatus of claim 13, wherein the tailgate steps are configured such that when the tailgate steps are released the tailgate steps swing freely away from the tailgate, bumper, and trailer hitch due to the pull of gravity on the tailgate step.

18. The apparatus of claim 13, wherein when the tailgate is in the fully open position the tailgate steps are ninety degrees from the tailgate and perpendicular to the ground.

19. The apparatus of claim 13, further configured such that when the user engages the tailgate latch to move the tailgate from the fully open position to the closed position the at least two tailgate steps are further configured to lock into the at least two tailgate channels.

20. The apparatus of claim 13, wherein the at least two tailgate steps may be configured to lay on the tailgate perpendicular to the ground, or the at least two tailgate steps may be configured to lay on the tailgate at a forty-five degree angle in relation to the ground.

* * * * *